Nov. 14, 1967     H. L. B. SEEGMILLER     3,352,157

INERTIA DIAPHRAGM PRESSURE TRANSDUCER

Filed June 17, 1965

*INVENTOR.*
HENRY L. B. SEEGMILLER

BY
ATTORNEYS 3,352,157
Patented Nov. 14, 1967

3,352,157
INERTIA DIAPHRAGM PRESSURE TRANSDUCER
Henry L. B. Seegmiller, Los Gatos, Calif., assignor to the United States of America as represented by the Administrator of the National Aeronautics and Space Administration
Filed June 17, 1965, Ser. No. 464,879
16 Claims. (Cl. 73—398)

ABSTRACT OF THE DISCLOSURE

A pressure transducer in which a diaphragm is substantially freely supported so that the motion of the diaphragm during the test period is resisted primarily only by the inertia of the diaphragm with relatively little resistance due to any elastic or spring return force in the diaphragm. The motion of the diaphragm, when subjected to a fluid force, is sensed and recorded directly from the movement of the diaphragm while the diaphragm is in motion and as a function of time. The acceleration of the diaphragm is thereby detected and recorded.

---

The invention described herein may be manufactured and used by or for the Government of the United States of America for governmental purposes without the payment of any royalties thereon or therefor.

This invention relates to measuring devices and more particularly to pressure transducers primarily designed to measure transient pressures.

The invention is especially adapted for use in measuring test model pressures in shock tubes, shock tunnels, or other devices which are subjected to pressure steps of short duration. Test facilities of this type which are necessary in the study of atmospheric entry, generate high velocity test gas flows with durations of a few microseconds to several milliseconds. It is of interest in these facilities to determine the distribution of the gas pressures about the surfaces of test models in order to obtain fundamental knowledge of the mechanism of such flows and to assist the vehicle designer in determining the aerodynamic performance and strength requirements of prototype vehicles.

Previous methods of measurement have relied on pressure transducers of a type which may be termed, steady-state elastic. In this type of transducer the pressure force applied to the face of the transducer is resisted by and is in equilibrium with the elastic restoring forces of the transducer elements, hence the term steady-state elastic. The transducer element against which the test pressure is applied is normally in the form of a diaphragm, and the magnitude of the pressure being tested is calculated by measuring the deflection of the diaphragm.

Since transducer sensitivity is directly related to the deflection of the elastic diaphragm, it is evident that as the required operating time is reduced, the moving elastic diaphragm must undergo increasingly high rates of acceleration to attain the required motion in the available time. These high rates of acceleration cause the inertial resistance of the moving diaphragm to assume importance is equilibrium between the applied pressure force and the elastic restoring force. Clearly, the concept of static equilibrium in the balance of pressure forces and elastic restoring forces is not applicable in the measurement of these very short duration pressure pulses. In other words, as the duration of the pressure pulse approaches or becomes less than the resonant period of a steady-state elastic transducer the inertia of the diaphragm causes large errors in the magnitude and phase of the output of the transducer. Thus, in order to measure very short duration pressure pulses an elastic type transducer would require a diaphragm with a very high resonant frequency. The difficulty is that in an elastic type system high resonant frequency inherently requires a high spring return force which of course makes a transducer of low sensitivity which cannot measure low pressures.

An additional difficulty is encountered in the use of the elastic steady-state concept for the measurement of short duration pressure pulses in gas flows of high temperature such as occur in the previously mentioned shock tunnels or shock tubes. The extremely hot gas which is generated as a consequence of gas flows at atmospheric entry speeds subjects the exposed transducer diaphragm to a pulse of intense heating. This heating pulse arises from both radiation and convection from the hot gas in which the test model is immersed. The non-uniform temperature distributions induced in the steady-state elastic transducer by this heating are troublesome because the previously calibrated relation of elastic restoring force and diaphragm deflection is altered by the non-uniform temperatures in the transducer.

It is apparent that new techniques are required by the desire to obtain fundamental knowledge of the gas pressures on the surface of test models in high temperature gas flows of short duration. It is therefore the object of the present invention to provide a means of obtaining these measurements.

By way of brief description the present invention solves the problem of measuring pressure pulses of short duration by providing a transducer in which the diaphragm is substantially freely moving so there will be relatively little elastic restoring force to retard the motion of the diaphragm. In orther words the inertia of the diaphragm, rather than its elastic spring force, is relied upon to resist the force of a pressure pulse and translate it into a pressure measurement, all as will be hereinafter described in more detail.

Thus the specific objetc of the invention is to provide a pressure transducer using the inertia of the diaphragm sensing element so that high sensitivity measurements can be made of very short duration pressure steps.

Another object of the invention is the reduction of measurement errors due to non-uniform heating of the transducer. Since temperature change has no effect on inertia, the inertia type diaphragm is a basic solution to the temperature problem.

A further object of the invention is to provide a pressure transducer which will not be subject to the objectionable "ringing" which results when conventional elastic type diaphragms are subjected to the very high frequency components of short duration pressure steps. As in the case of the temperature problem the invention's inertia type diaphragm reduces the basis of the objectionable ringing; namely, the spring return force of the diaphragm is substantially removed.

These and other objects and features of advantage will become more apparent from the following detailed description wherein reference is made to the accompanying drawings in which.

Figure 2:
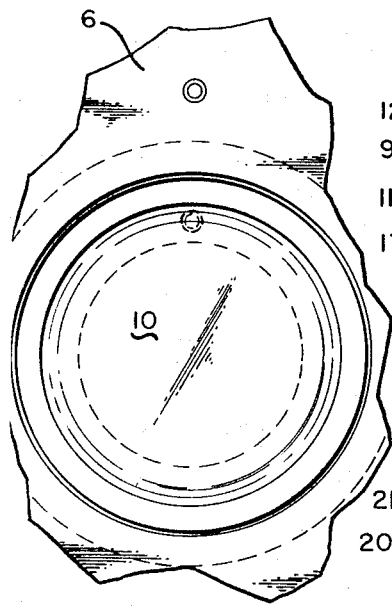
FIGURE 2 is an elevational view of the diaphragm portion of FIGURE 1 taken from the left of FIGURE 1.
Figure 1:
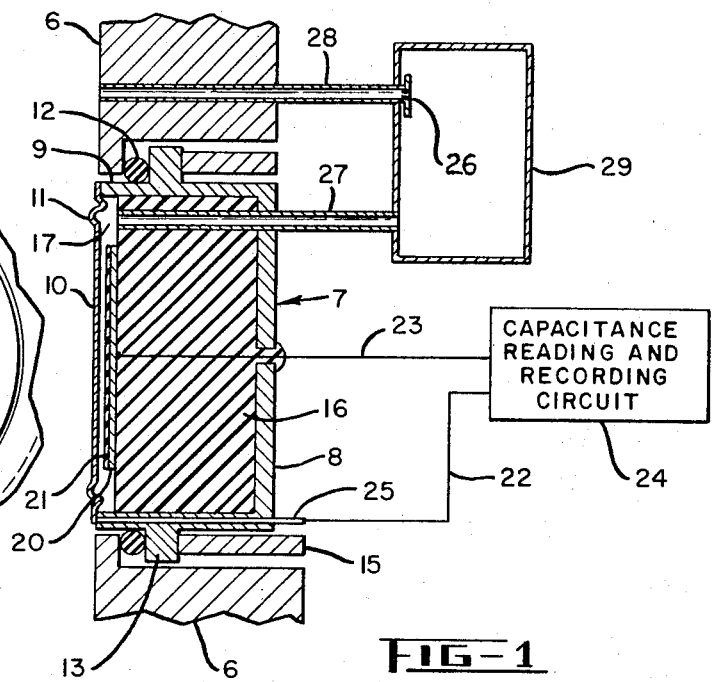
FIGURE 1 is a schematic sectional view of a diaphragm pressure transducer utilizing the principles of the invention.

Referring in more detail to the drawings, FIGURE 1 shows the transducer mounted in the wall 6 of a test model which is intended for testing under conditions of the type previously described. The transducer itself comprises a cup-shaped housing structure 7 having a bottom wall 8 and a cylindrical side wall 9. The sensing element of the transducer is a diaphragm 10. The diaphragm is secured to the housing wall 9 by brazing or other suitable bonding means. The transducer is intended to measure the pressure of the gaseous environment on the left of the diaphragm as viewed in FIGURE 1.

The basic requirement of the invention is that the diaphragm 10 be substantially freely supported so that motion of the diaphragm during the test interval is resisted primarily only by the inertia of the diaphragm with relatively little resistance due to any elastic or spring return force in the diaphragm. One way in which the spring return force can be reduced is to form concentric corrugations 11 adjacent to the periphery of the diaphragm. Another way to obtain a low spring return force is to make the diaphragm of a material having high density and low elastic modulus such as platinum. In order to increase the sensitivity a low mass diaphragm is required, and can be provided by making the diaphragm of a light plastic material. The inner face of a plastic diaphragm would be metallized to function in the electrical circuit which will be hereinafter described.

The housing 7 is sealed in the model 6 by a sealing ring 12 compressed between the model and a rim 13 on the transducer housing structure. The parts can be conveniently secured in assembled relation by a clamp ring 15 which abuts the rim 13 and engages the model in a cooperating manner not shown.

The cup-shaped housing 7 is nearly filled with insulating material 16 but enough space is left to provide a chamber 17 which will accommodate the deflection of the diaphragm under the impact of the pressure pulse on the outside of the diaphragm. The metallic diaphragm 10 forms one plate of a capacitor and the other plate is formed by a metal disk 20 mounted on the insulation 16. Since the diaphragm 10 is purposely provided with very little elastic resistance to movement it will tend to strike plate 20 and it is therefore desirable to provide plate 20 with an insulating coating 21 which will arrest the motion of the diaphragm.

In operation the exposed left face of diaphragm 10 will be subjected to a pressure pulse of short duration and very high rise time which will accelerate the diaphragm in the direction of the fixed plate 20. The diaphragm is accelerated in accordance with Newton's second law: $a=F/M$, where $a$ is the acceleration, F is the force of the gas against the diaphragm, and M is the mass of the diaphragm. The pressure of the gas is of course equal to the force F divided by the area of the diaphragm, and the mass M is a fixed and known quantity. Thus, if the acceleration is known, the pressure can be calculated therefrom. The acceleration is measured by recording the time-displacement history of the diaphragm movement toward the stationary plate 20. Displacement of the diaphragm toward the stationary plate 20 will cause a change in the capacitance between the diaphragm and the stationary plate. Therefore measurement of the capacitance will provide a measurement of the displacement. Thus, it is merely necessary to measure and record the change in capacitance as a function of time in order to be able to calculate the diaphragm acceleration and thence the gas pressure. Accordingly the diaphgram 10 and plate 20 are connected by leads 22 and 23 to a conventional circuit 24 which measures capacitance and records it as a function of time. The lead 22 is preferably connected directly to the diaphragm 10 and is surrounded by a protective sleeve 25. In some cases it is desirable to insulate the diaphragm 10 from the housing 7 to isolate the capacitance measuring circuit as much as possible from the surrounding elements. Leads 22 and 23 are of course preferably insulated throughout their lengths.

In order to obtain a steady-state pressure balance across the diaphragm, conduit means are provided for connecting the space on the left side of the diaphragm with the chamber 17 on the right of the diaphragm. However, in order to prevent the pressure pulse from appearing on both sides of the diaphragm simultaneously, the conduit means are in the form of a fluid delay line. More specifically, the delay line comprises tubes 27 and 28 opening to the opposite sides of the diaphragm and interconnected by a delay chamber 29. A restricted orifice 26 is preferably added to the end of tube 28 into the chamber 29.

Figure 3:
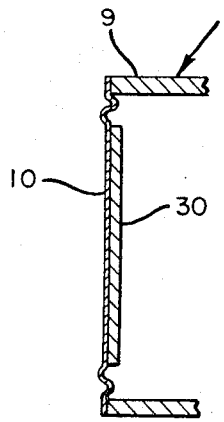
FIGURE 3 is a partial sectional view showing a modified diaphragm construction.

FIGURE 3 shows a slightly modified embodiment which is particularly designed to be less sensitive than the embodiment of FIGURE 1 and thus adapted for use with higher pressures. The embodiment of FIGURE 3 is exactly like the embodiment of FIGURE 1 except that a metal mass 30 has been added to the diaphragm 10. If necessary chamber 17 is enlarged to accommodate the mass 30.

Figure 4:
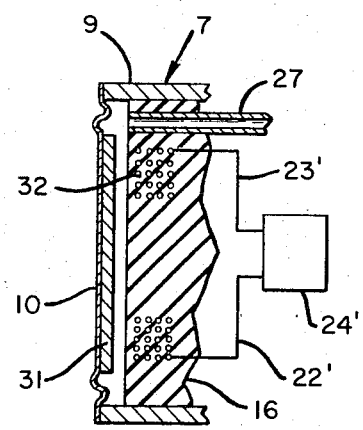
FIGURE 4 is a sectional view of the center portion of a transducer similar to FIGURE 1 but embodying a different means for sensing diaphragm acceleration.
Figure 5:
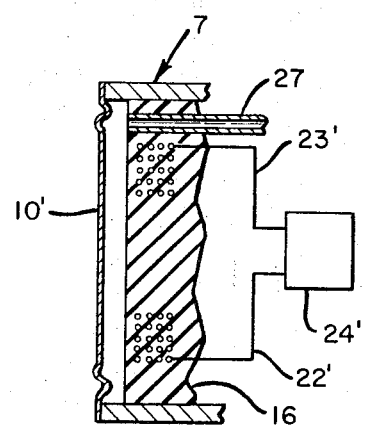
FIGURE 5 is a view similar to FIGURE 4 but showing a slightly modified diaphragm construction.

FIGURE 4 shows another embodiment of the invention wherein the means for measuring acceleration of the diaphragm is different from the capacitive means of FIGURE 1. More specifically, a magnetic disk 31 is attached to the diaphragm 10, and the capacitor plate 20 is replaced by a wire sensing coil 32. When the field of magnet 31 moves relative to the coil 32, an output voltage will be generated in the coil as a function of the acceleration of the magnet. Accordingly, the ends of the coil 32 are connected by leads 22' and 23' to a conventional circuit 24' for reading and recording the output voltage. FIGURE 5 is the same as FIGURE 4 except that the separate magnet 31 is omitted and the diaphragm 10' is a magnetized piece of magnetic material.

In summary, it should now be understood that the invention requires that the diaphragm be substantially freely supported whereby sudden movement of the diaphragm is resisted primarliy only by the force of inertia. Resistance to motion of the diaphragm consists of two forms, inertial $(F_1=Ma)$ and elastic $(F_e=kx)$; where F is defined as the resistive force (inertial or elastic), M is the mass of the diaphragm, $a$ is the diaphragm acceleration, $k$ is the elastic spring constant of the diaphragm, and $x$ is the diaphragm deflection from the rest position to the sensing point. For the diaphragm to be substantially freely supported as defined in the description and claims requires that the inertial resistive force must predominate during the measurement. In addition, the invention differs from the prior art by measuring the acceleration of the diaphragm as distinguished from merely measuring the displacement of the diaphragm.

Although specific details of the present invention are shown and described herein, it is to be understood that modifications may be made therein without departing from the spirit and scope of the invention as set forth in the appended claims.

Having thus described the invention what is claimed as new and desired to be secured by Letters Patent is:

1. A pressure transducer comprising a housing structure, a diaphragm supported by said housing structure and adapted to be subjected on one side to a gaseous environment to be tested, said diaphragm being supported around its periphery by said housing structure, an annular corrugation in said diaphragm rendering it substantially free to move except for its resistance due to the force of inertia, said housing structure forming a space on the other side of said diaphragm, passage means connecting said space to said one side of said diaphragm and forming a fluid delay line for equalizing the steady-state pressure on both sides of said diaphragm, and circuit means connected to said diaphragm for detecting continuously the movement of said diaphragm and recording continuously the movement of said diaphragm directly from the motion of said diaphragm.

2. A pressure transducer as claimed in claim 1 in which said diaphragm is made of platinum.

3. A pressure transducer as claimed in claim 1 in which said fluid delay line comprises means forming a delay chamber.

4. A pressure transducer as claimed in claim 1 in which said means for detecting movement of said diaphragm comprises a magnetic circuit having a sensing coil portion and a magnetic field generating portion, and one of said circuit portions is movable with said diaphragm.

5. A pressure transducer as claimed in claim 1 in which said means for detecting movement of said diaphragm comprises a circuit for measuring capacitance as a function of time and in which circuit said diaphragm forms one plate of a capacitor and the other plate of the capacitor is formed by a stationary member.

6. A pressure transducer as claimed in claim 5 further comprising an insulating abutment intermediate said diaphragm and said stationary plate.

7. A pressure transducer as claimed in claim 1 wherein said diaphragm is made from material having a high density and a low elastic modulus.

8. A pressure transducer comprising a housing structure, a diaphragm supported by said housing structure and adapted to be subjected on one side directly to a gaseous environment, said diaphragm being substantially freely supported whereby sudden movement of the diaphragm is resisted primarily only by the force of inertia, and means for measuring acceleration of said diaphragm.

9. A pressure transducer as claimed in claim 8 wherein said diaphragm is made of platinum.

10. A pressure transducer as claimed in claim 8 and comprising a fluid delay line for equalizing the steady-state pressure on both sides of said diaphragm.

11. A pressure transducer as claimed in claim 8 in which said means for measuring the acceleration of said diaphragm comprises a magnetic circuit having a sensing coil portion and a magnetic field generating portion, and one of said circuit portions is movable with said diaphragm.

12. A pressure transducer as claimed in claim 8 in which said means for measuring acceleration of said diaphragm comprises a circuit for measuring capacitance as a function of time and in which circuit said diaphragm forms one plate of a capacitor and the other plate of the capacitor is formed by a stationary member.

13. A pressure transducer as claimed in claim 8 wherein said diaphragm is made from material having a high density and a low elastic modulus.

14. A method of measuring fluid pressure comprising exposing a substantially freely supported sensing member to the fluid to be measured, detecting the motion of said sensing member under exposure to the fluid to be measured as a function of time, and measuring the acceleration of said sensing member.

15. A pressure transducer comprising a housing structure, a diaphragm supported by said housing structure and adapted to be subjected on one side to a gaseous environment to be tested, said diaphragm being substantially free to move except for its resistance due to the force of inertia, said housing structure forming a space on the other side of said diaphragm, and passage means connecting said space to said one side of said diaphragm and forming a fluid delay line for equalizing the steady-state pressure on both sides of said diaphragm, and means for measuring the acceleration of said diaphragm when it moves under the force of sudden pressure.

16. A pressure transducer comprising a housing structure, a diaphragm supported by said housing structure and adapted to be subjected on one side to a gaseous environment to be tested, said diaphragm being supported around its periphery by said housing structure, an annular corrugation in said diaphragm rendering it substantially free to move except for its resistance due to the force of inertia, said housing structure forming a space on the other side of said diaphragm, and passage means connecting said space to said one side of said diaphragm and forming a fluid delay line for equalizing the steady-state pressure on both sides of said diaphragm, and means for measuring the acceleration of said diaphragm when it moves under the force of sudden pressure.

References Cited

UNITED STATES PATENTS

| 1,956,403 | 4/1934 | Scott | 73—398 XR |
| 2,775,122 | 12/1956 | Smith et al. | 73—179 |
| 2,829,520 | 4/1958 | Stanton | 73—179 XR |
| 2,988,921 | 6/1961 | Rubin. | |
| 3,054,295 | 9/1962 | Burner | 73—407 XR |
| 3,068,700 | 12/1962 | Bourns | 73—398 |
| 3,204,055 | 8/1965 | Barksdale | 92—91 XR |

FOREIGN PATENTS

| 492,639 | 9/1938 | Great Britain. |

DAVID SCHONBERG, *Primary Examiner.*

LOUIS PRINCE, *Examiner.*

D. O. WOODIEL, *Assistant Examiner.*